Oct. 3, 1961 S. MEYER 3,002,690
CONTINUOUS INTEGRATOR
Filed July 3, 1958
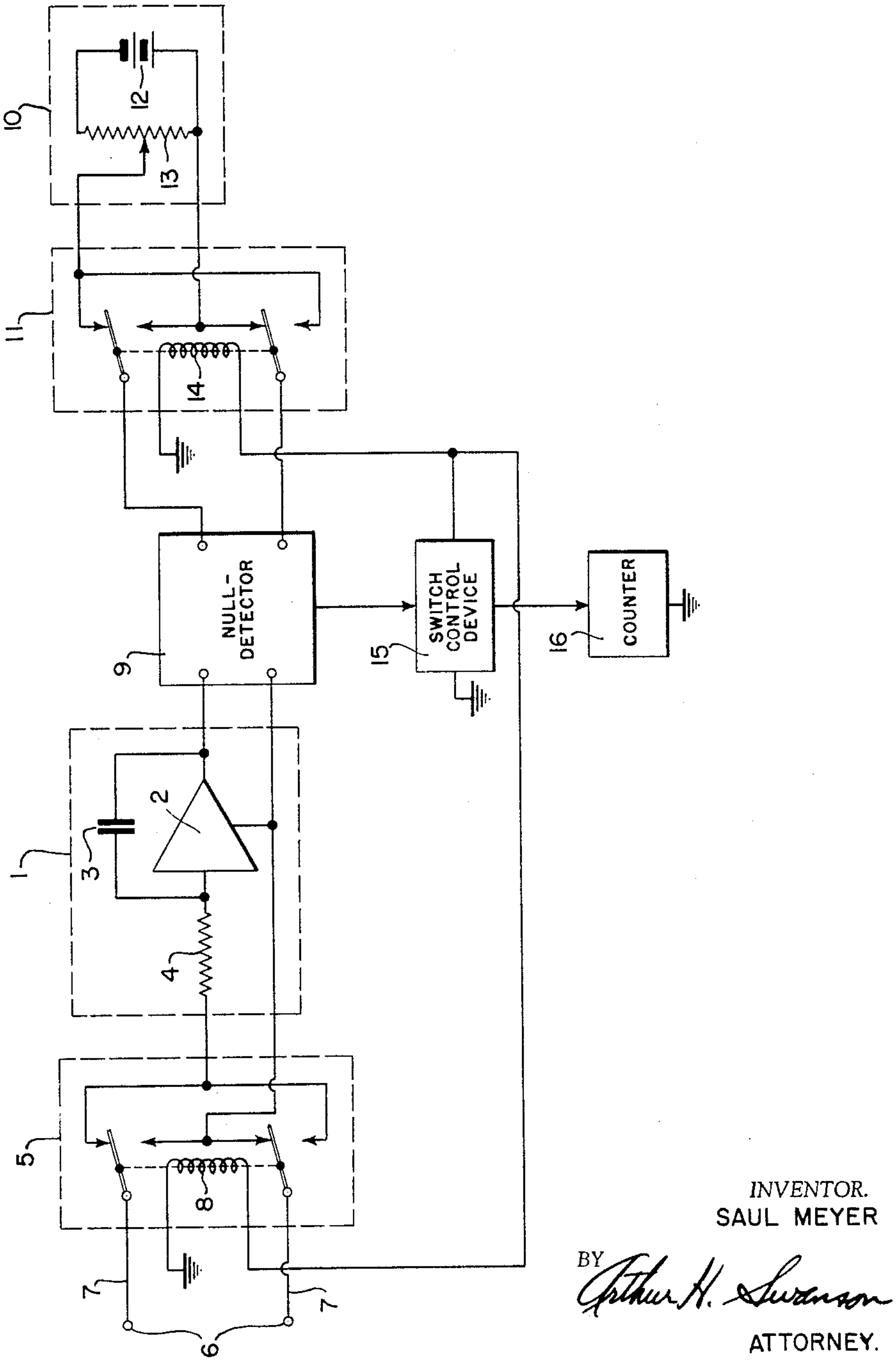
INVENTOR.
SAUL MEYER
BY Arthur H. Swanson
ATTORNEY.

United States Patent Office 3,002,690
Patented Oct. 3, 1961

3,002,690
CONTINUOUS INTEGRATOR

Saul Meyer, Havertown, Pa., assignor to Minneapolis-Honeywell Regulator Company, Minneapolis, Minn., a corporation of Delaware Filed July 3, 1958, Ser. No. 746,528
11 Claims. (Cl. 235—183)

This invention relates to electrical computing circuits. More specifically, the present invention relates to an electrical integrator.

An object of the present invention is to provide an improved electrical integrator.

Electrical integrators are frequently used in analogue computers and process monitoring equipment to perform a time-integration on a suitable input signal. The integrating circuit frequently employed in the above mentioned applications comprises a serial combination of an input resistor and a unidirectional voltage amplifier; i.e., a so-called operational amplifier, having capacitive feedback. The integration operation of the aforementioned circuit is adjusted by a proper choice of the values of the input resistor and the feedback capacitor. The accurate operation of this circuit has, heretofore, depended on the elimination of spurious charging currents for the feedback capacitor and the stabilization of the physical characteristics of the feedback capacitor and the input resistor. One common approach which has been heretofore used in an effort to solve these problems has been the use of a special operational amplifier to eliminate a major source of spurious charging current, namely, amplifier grid current, and ultra-stable precision components for the feed-back capacitor and the input resistor.

That approach does not provide a completely satisfactory solution with regard to expense and long-term stability. A further disadvantage of the aforementioned circuit, particularly in the field of process monitoring, concerns the nature of the integration operation performed by the circuit. It is a characteristic of the aforementioned circuit that the feedback capacitor is capable of integrating the input signal only for a limited period of time. This characteristic stems from the fact that the voltage charge accumulated by the feedback capacitor during the integration operation is limited by the voltages available to the circuit. Consequently, the feedback capacitor must be discharged after a period of operation to permit a further integration of the input signal. This intermittent nature of the integration operation may introduce errors into a continuous process monitoring device.

Thus, it may be seen that these prior art devices do not offer a completely satisfactory solution to the problems of long-term operation and accuracy.

It is, accordingly, another object of the present invention to provide an improved apparatus for overcoming the aforementioned disadvantages of the prior art integrators.

Still another object of the present invention is to provide an improved electrical integrator which is capable of continuous integration.

Still another object of the present invention is to provide an improved electrical integrator having particular utility in the measurement of fluid flow in a conduit.

A further object of the present invention is to provide an improved electrical integrator which includes means for compensating for grid-current of an operational amplifier.

A still further object of the present invention is to provide an improved electrical integrator which is characterized by simplified operation and construction.

In accomplishing these and other objects, there has been provided, in accordance with the present invention, an electrical integrator for performing a continuous integration of an input signal.

The integrator includes an operational amplifier with a capacitive feedback and a pair of polarity reversing switches. The polarity reversing switches control the applied polarities of an input signal voltage and a preset integration limit voltage. The input signal is integrated by the feedback capacitor of the operational amplifier, and the resulting integrated output signal is applied to a null-detector. The null-detector compares the integrated output signal with the preset integration limit voltage. When the integrated output signal is substantially equal to the limit voltage, a signal from the null-detector actuates the reversing switches. The reversing switches, simultaneously, reverse the applied polarities of the input signal and of the integration limit voltage. The polarity reversal supplies a new reference limit voltage for a continuation of the integration operation. Also, the polarity reversal is detected by an output device as an indication of the integration operation.

A better understanding of the present invention may be had from the following detailed description when read in connection with the accompanying drawing, in which the single figure is a schematic diagram of an electrical integrator embodying the present invention.

Referring to the figure in more detail, there is shown a typical electronic integrating circuit 1. The integrating circuit comprises an operational amplifier 2, a feedback capacitor 3 and an input resistor 4. The operation of the integrating circuit 1 is well-known in the art as described on page 138 of "Electronic Analogue Computers" by Korn and Korn, published by McGraw-Hill, 1952.

Briefly, the integrating circuit 1 integrates the input signal by accumulating a charge on the feedback capacitor 3 to represent a summation of the input signal during a period of time. The operational amplifier 2 is used to linearize the charging operation of the feedback capacitor 3 and to obviate, partially, the opposition of the accumulated charge with respect to the input signal.

The input signal for the integrating circuit 1 is obtained through an input signal reversing switch 5. A pair of input terminals 6 are provided for connection to the output signal of a unidirectional signal source. The signal source may be a monitoring transducer measuring fluid flow or other physical variables. One form that the signal source may take is illustrated in Patent No. 1,191,416, entitled "Measuring Apparatus," by George H. Gibson, issued on July 8, 1916. The integration of the output signal of such a signal source would, consequently, represent a measurement of the total flow during the time of integration. The input signal is applied to the reversing switch 5 from the input terminal 6 by a pair of connecting leads 7. The reversing switch 5, actuated by a relay coil 8, controls the polarity of the unidirectional input signal as applied to the integrating circuit 1.

The output signal of the integrating circuit 1 is applied as one input signal to a null-detector 9. The null-detector 9 may be any suitable one of many electronic and electro-mechanical devices used to compare two voltages and to determine whether or not one voltage equals the other; such devices being well-known in the art.

An example of a suitable electro-mechanical device is a double-coil sensitive relay manufactured by Thomas A. Edison Industries, West Orange, New Jersey, and designated as model 219.

A second input signal to be applied to the null-detector 9 is obtained from a combination of a reference level signal source 10 and a reference signal reversing switch 11. The reference level signal source 10 comprises a unidirectional voltage supply, represented by a battery 12 and a potentiometer-type resistor having a variable slider 13. The unidirectional output voltage of the reference signal source 10 is connected to the reference signal switch 11. The reference switch 11, subsequently, applies the reference voltage as the second input to the null-detector 9. The reference signal switch 11, actuated by a cooperating relay coil 14, is used to reverse the polarity of the reference level signal as applied to the null-detector 9. An output signal from the null-detector 9 is applied to a switch control device 15. The switch control device 15 may be any suitable electronic or electro-mechanical device. An example of a suitable electronic device is a bistable multivibrator; such devices being well-known in the art. The switch control device 15 produces an energizing signal to control the operation of the input signal switch 5 and the reference signal switch 13 by means of their respective relay coils 8 and 14. In addition, an output signal from the switch control device 15 is fed to an output device 16, such as electronic or electro-mechanical counter; such devices being well-known in the art.

The mode of operation of the apparatus of the present invention follows.

Assuming the relay coils 8 and 14 are initially unenergized, and the input signal switch 5 and the reference signal switch 11 are initially in one of two positions; e.g., the positions illustrated in the figure, the unidirectional input signal is applied to the integrating circuit 1 with a polarity determined by the position of the input signal switch 5. The output signal of the integrating circuit 1 is applied to the null-detector 9 with a polarity corresponding to the polarity of the input signal applied to the integrating circuit 1. The voltage supply 12 of the reference signal source 10 is arranged to apply to the null-detector 9 a reference level signal, through the reference signal switch 11, with the same polarity as that of the output signal of the integrating circuit 1. The level of the reference level signal is adjusted by means of the potentiometer-type resistor 13 to a predetermined value. This value should be such as to determine the limit to which the feedback capacitor 3 may be charged, thereby determining the limit of the integration operation. Assuming the feedback capacitor 3 is initially uncharged, the input signal is integrated by the integrating circuit 1 in a manner as previously mentioned. When the output signal of the integrating circuit 1 is substantially equal to the reference level signal, the null-detector 9 is actuated to produce a control signal for the switch control device 15. The switch control device 15, in response to this signal is actuated to energize the relay coils 8 and 14 of the input signal switch 5 and the reference signal switch 11, respectively. Simultaneously, an output signal from the switch control device 15 is sent to the counter 16 as an indication of the operation of the switch control device 15.

The energization of the relay coils 8 and 14 reverses the position of the input signal switch 5 and of the reference signal switch 11. As a result, the polarity of the input signal as applied to the integrating circuit 1 is reversed with respect to its initial polarity. Further, the polarity of the reference level signal, as applied to the null-detector 9, is also reversed with respect to its initial polarity. Since the polarity and level of the output signal of the integrating circuit 1, as represented by the charge on the feedback capacitor 3, remains at the value which resulted in the above mentioned operation of the null-detector 9, the input signals to the null-detector 9 from the integrating circuit 1 and the reference level source 10 are not equal to each other. Therefore, the control signal from the null-detector 9 is terminated until further integration of the input signal, as follows, again actuates the null-detector 9.

The integration of the input signal is continued in a manner similar to that described hereinbefore with the additional condition that the feedback capacitor 3 is precharged to the initial reference limit voltage. Consequently, the second part of the integration operation continues with a discharge of the feedback capacitor 3 through a zero charge level and with a recharge of the capacitor 3 to the reference limit level in the opposite polarity as determined by the applied reference level signal. Assuming the integrating circuit 1 operates in a linear manner and the input signal is a constant valve, the second part of the integration operation is performed during a time interval which is twice that of the initial integration operation hereinbefore described. The second part of the integration operation is the first full-cycle of integration, and all succeeding parts of the integration operation are full-cycles of integration. Since the monitoring of a continuous process may require many thousands of full-cycles of integration, the effect of the initial half-cycle may be negligible in the final indication of the counter 16. However, a compensation for the half-cycle of integration may be accomplished by using the output signal from the switching device 15 at the end of the first half-cycle to pre-condition the counter 16 to register succeeding energizing signals. As a result, the effect of the first half-cycle on the counter 16 is automatically eliminated.

At the completion of the second part of the integration operation; i.e., when the reference level signal is substantially equal to the output signal from the integrating circuit 1, the null-detector 9 again signals the switch control device 15. The switch control device 15, in turn, de-energizes the relay coils 8 and 14 of the input signal switch 5 and the reference signal switch, respectively. Simultaneously, an output signal is sent to the counter 16. The position of the reversing switches 5 and 11 is now the same as the initial condition previously described. Since the input signals to the null-detector 9 are again not equal to each other, the null-detector 9 resumes an inactive status. The third part of the integration operation and all succeeding parts of the integration operation are performed in a similar manner to that described above in relation to the second part of the integration operation.

The integration operation of the present invention, described above, eliminates any long time-delay required for a discharge of the feedback capacitor 3. As previously mentioned, spurious charging currents for the feedback capacitor 3 may introduce errors in the integration operation. It has been found that a grid current from the operational amplifier is the predominating factor in the spurious charging of the feedback capacitor 3. When the grid-current and the input signal add together, the charging operation of the feedback capacitor 3 is accelerated with respect to an effect with only the input signal. Conversely, the charging operation of the feedback capacitor 3 is retarded when the grid-current subtracts from the input signal. The polarity-reversals, in accordance with the present invention, alternately change the relationship of the input signal to the grid-amplifier 2. Since the accelerations and retardations of the charging operation of the feedback capacitor 3 are of equal magnitude and occur alternately, the effect of the grid-current is self-neutralizing. As a result, the present invention obviates the effect of the grid-current on the integration operation.

Thus it may be seen that there has been provided in accordance with the present invention, an electrical integrator for continuous integration, which is characterized by the ability to cancel the effect of spurious charging currents and to provide stability of integration accuracy.

What is claimed is:

1. A continuous integrator comprising, in combination, an integrating circuit including an operational amplifier and a capacitive feedback circuit for said amplifier, means for applying to said integrator circuit a signal to be integrated, a reference level signal source, null-detecting means for comparing output signals from said integrator circuit with a reference level signal from said source, said null-detecting means being operative to produce a signal upon a substantial equality of the compared signals, means responsive to said signal from said null-detecting means for reversing the polarity of the signals applied to said integrator circuit and of the signals applied to said comparing means from said source, and output means responsive to said signal from said null-detecting means.

2. A continuous integrator comprising, in combination, an integrating circuit including an operational amplifier and a capacitive feedback circuit for said amplifier, means for applying to said integrator circuit a signal to be integrated, a reference level signal source, null-detecting means for comparing output signals from said integrator circuit with a reference level signal from said source, said null-detecting means being operative to produce a signal upon a substantial equality of the compared signals, means responsive to said signal from said null-detecting means for reversing the polarity of the signals applied to said integrator circuit and of the signals applied to said comparing means from said source, and output means responsive to said signal from said null-detecting means, said output means being a counter.

3. A continuous integrator comprising, in combination, an integrating circuit including an operational amplifier and a capacitive feedback circuit for said amplifier, means for applying to said integrator circuit a signal to be integrated, a reference level signal source, null-detecting means for comparing output signals from said integrator circuit with a reference level signal from said source, said null-detecting means being operative to produce a signal upon a substantial equality of the compared signals, means responsive to said signal from said null-detecting means for reversing the polarity of the signals applied to said integrator circuit and of the signals applied to said comparing means from said source, said last-mentioned means including two relay-actuated polarity-reversing switches, and output means responsive to said signal from said null-detecting means.

4. A continuous integrator comprising, in combination, an integrating circuit including an operational amplifier and a capacitive feedback circuit for said amplifier, means for applying to said integrator circuit a signal to be integrated, a reference level signal source, said reference level signal source including a battery and a potentiometer-type resistor having a variable slider, null-detecting means for comparing output signals from said integrator circuit with a reference level signal from said source, said null-detecting means being operative to produce a signal upon a substantial equality of the compared signals, means responsive to said signal from said null-detecting means for reversing the polarity of the signals applied to said integrator circuit and of the signals applied to said comparing means from said source, and output means responsive to said signal from said null-detecting means.

5. A continuous integrator for integrating unidirectional input signals comprising, in combination, an input circuit, said input circuit including first polarity reversing means for reversing said input signals, an operational amplifier having a capacitive feedback, said amplifier having an input circuit and an output circuit, said input circuit of said amplifier being connected to said reversing means, reference level signal means for establishing a unidirectional reference level signal, second polarity reversing means for reversing said reference level signal, null-detecting means for comparing signals from said output circuit of said operational amplifier with signals from said second reversing means, a switch-control circuit responsive to said null-detecting means for simultaneously energizing said first polarity reversing means and said second polarity reversing means, and utilization means responsive to said switch-control circuit.

6. A continuous integrator for integrating unidirectional input signals comprising, in combination, an input circuit, said input circuit including first polarity reversing means for reversing said input signals, an operational amplifier having a capacitive feedback, said amplifier having an input circuit and an output circuit, said input circuit of said amplifier being connected to said reversing means, reference level signal means for establishing a unidirectional reference level signal, second polarity reversing means for reversing said reference level signal, null-detecting means for comparing signals from said output circuit of said operational amplifier with signals from said second reversing means, a switch-control circuit responsive to said null-detecting means for simultaneously energizing said first polarity reversing means and said second polarity reversing means, and utilization means responsive to said switch-control circuit, said utilization means being a counter.

7. A continuous integrator for integrating unidirectional input signals comprising, in combination, an input circuit, said input circuit including first polarity reversing means for reversing said input signals, said first polarity reversing means being a relay-actuated polarity-reversing switch, an operational amplifier having a capacitive feedback, said amplifier having an input circuit and an output circuit, said input circuit of said amplifier being connected to said reversing means, reference level signal means for establishing a unidirectional reference level signal, second polarity reversing means for reversing said reference level signal, said second polarity reversing means being a relay-actuated polarity-reversing switch, null-detecting means for comparing signals from said output circuit of said operational amplifier with signals from said second reversing means, a switch-control circuit responsive to said null-detecting means for simultaneously energizing said first polarity reversing means and said second polarity reversing means, and utilization means responsive to said switch-control circuit.

8. A continuous integrator for integrating unidirectional input signals comprising, in combination, an input circuit, said input circuit including first polarity reversing means for reversing said input signals, an operational amplifier having a capacitive feedback, said amplifier having an input circuit and an output circuit, said input circuit of said amplifier being connected to said reversing means, reference level signal means for establishing a unidirectional reference level signal, said reference level signal means including a battery and a potentiometer-type resistor having a variable slider, second polarity reversing means for reversing said reference level signal, null-detecting means for comparing signals from said output circuit of said operational amplifier with signals from said second reversing means, a switch-control circuit responsive to said null-detecting means for simultaneously energizing said first polarity reversing means and said second polarity reversing means, and utilization means responsive to said switching means.

9. A continuous integrator comprising, in combination, an integrating means, means for applying to said integrator circuit a signal to be integrated, a reference level signal source, means for comparing output signals from said integrator circuit with a reference level signal from said source, said means for comparing being operative to produce a signal upon a substantial equality of the compared signals, means responsive to said signal from said means for comparing for reversing the polarity of the signals applied to said integrating means and of the signals applied to said means for comparing from said source, and output means responsive to said signal from said means for comparing.

10. A continuous integrator comprising, in combination, an integrating means, means for applying to said integrator circuit a signal to be integrated, a reference level signal source, means for comparing output signals from said integrator circuit with a reference level signal from said source, said means for comparing being operative to produce a signal upon a substantial equality of the compared signals, means responsive to said signal from said means for comparing for reversing the polarity of the signals applied to said integrating means and of the signals applied to said means for comparing from said source, said last mentioned means including two relay-actuated polarity-reversing switches, and output means responsive to said signal from said means for comparing.

11. A continuous integrator for integrating unidirectional input signals comprising, in combination, an input circuit, said input circuit including first polarity reversing means for reversing said input signals, an integrating circuit having an input circuit and an output circuit, said input circuit of said integrating circuit being connected to said reversing means, reference level signal means for establishing a unidirectional reference level signal, second polarity reversing means for reversing said reference level signal, means for comparing signals from said output circuit of said integrating circuit with signals from said second reversing means, said means for comparing being operative to produce a signal upon a substantial equality of the compared signals, a switch-control circuit responsive to said means for comparing for simultaneously energizing said first polarity reversing means and said second polarity reversing means, and utilization means responsive to said switch-control circuit.

References Cited in the file of this patent

UNITED STATES PATENTS

| | | |
|---|---|---|
| 2,239,363 | Gilbert | Mar. 22, 1941 |
| 2,575,951 | Gilbert | Nov. 20, 1951 |
| 2,661,153 | Vance | Dec. 1, 1953 |
| 2,792,988 | Golberg | May 21, 1957 |
| 2,864,556 | Raymond | Dec. 16, 1958 |